United States Patent [19]

Yip

[11] Patent Number: 4,837,653
[45] Date of Patent: Jun. 6, 1989

[54] QUASI-POWER MEASUREMENT CIRCUIT

[75] Inventor: Douglas Yip, Bellevue, Wash.

[73] Assignee: Data I/O Corporation, Redmond, Wash.

[21] Appl. No.: 67,360

[22] Filed: Jun. 26, 1987

[51] Int. Cl.⁴ .............................................. H02M 3/26
[52] U.S. Cl. ....................................... 361/86; 361/87; 361/88; 361/93; 323/276
[58] Field of Search .............................. 361/18, 86–88, 361/91, 93; 323/289, 277, 278, 279, 275, 276; 340/657, 660, 664

[56] References Cited

U.S. PATENT DOCUMENTS

| | | | |
|---|---|---|---|
| 3,374,424 | 3/1968 | Weichmann | 323/275 |
| 3,723,774 | 3/1973 | Rogers | 323/277 |
| 3,745,444 | 10/1973 | Calkin et al. | 323/289 |
| 3,796,943 | 3/1974 | Nelson et al. | 361/18 |
| 4,021,701 | 5/1977 | Davies | 361/18 |
| 4,371,824 | 2/1983 | Gritter | 361/18 |
| 4,390,828 | 6/1983 | Converse et al. | 323/278 |
| 4,531,173 | 7/1985 | Yamada | 361/18 |

Primary Examiner—A. D. Pellinen
Assistant Examiner—Jeffrey A. Gaffin
Attorney, Agent, or Firm—Seed and Berry

[57] ABSTRACT

A circuit for signaling when an electrical component is consuming excessive power and for protecting the electrical component from the excessive power. The electrical component is connected to a circuit which supplies and measures the current through and measures the voltage drop across the component. The circuit produces a comparison voltage that represents the sum of the current through and voltage across the component, as normalized according to the maximum current and voltage that are expected to be used by the component. The sum of the values of the current and voltage is an approximation to the power consumed by the electrical component. The comparison voltage is compared to a threshold voltage that represents an approximate maximum power level to be sustained by the component. If the first voltage exceeds the threshold voltage, the comparator produces an overpower signal that can be used to cause the current supply to the electrical component to be interrupted.

20 Claims, 1 Drawing Sheet

QUASI-POWER MEASUREMENT CIRCUIT

DESCRIPTION

1. Technical Field

The present invention relates to a circuit for protecting an electrical component from excessive power, and more particularly, to a circuit for producing an approximation of the power being consumed by the electrical component and producing a signal or interrupting the electrical current to the component when the approximation exceeds a threshold.

2. Background Art

It is known in the prior art to protect an electrical component by limiting the current passing through the component. This can be particularly important in circuit programmers and testers, where the component can be a part of a complex integrated circuit which will be rendered useless if the component is caused to fail while being programmed or tested. While this technique may be suitable when the voltage drop across the electrical component is well controlled, it can be unsuitable when the voltage across the electrical component is not constrained. When the voltage drop across the electrical component is near an allowed maximum for any current level, the power presented to the electrical component can exceed a practical limit if the current rises about a minimal current level.

The power level consumed by an electrical component is proportional to the product of the current passing through the component and the voltage drop across the component. While it is possible to develop a circuit that measures the current and voltage to which the electrical component is subjected and then computes their product, such a circuit can be unnecessarily complex and/or sophisticated.

DISCLOSURE OF THE INVENTION

It is an object of the present invention to produce a circuit for protecting an electrical component from excessive power in a particularly simple way.

It is another object of the present invention to produce an electronic circuit that can approximate the power consumed by an electronic component by combining measurements of the current through and the voltage across an electronic component.

It is yet another object of the present invention to provide a temperature-compensated circuit for protecting a circuit from consuming excessive power.

In general, the circuit for protecting an electrical component from excessive power comprises means for measuring the current thrugh the electrical circuit, means for measuring the voltage across the electrical circuit, means for providing a first voltage that represents the sum of the values of I and V, I being a normalized current through the electrical component and V being a normalized voltage across the electrical component. The first voltage is an approximation to the power consumed by the electrical component. The invention further comprises means for comparing the first voltage to a threshold voltege and producing an overpower signal when the first voltage exceeds the threshold voltage and means for protecting the electrical component by interrupting the current through the electrical component un response to the overpower signal.

In a specific embodiment, the circuit can be realized as a temperature-compensated transistor circuit.

BEST MODE FOR CARRYING OUT THE INVENTION

Figure 1:
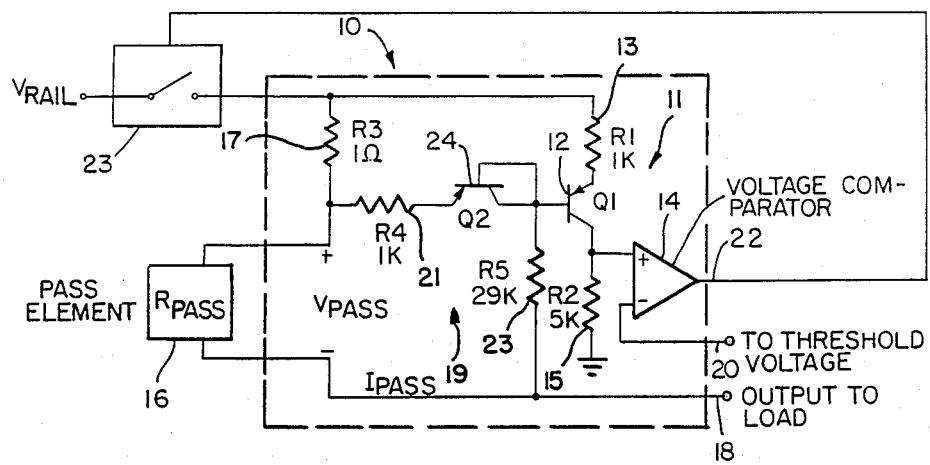
FIG. 1 is a schematic diagram of an electrical circuit built according to the present invention.

FIG. 1 is a schematic diagram of an electrical circuit realizing the power protection circuit 10 of the present invention. The circuit consists of a sense amplifier 11 comprising PNP transistor 12 and resistors 13 (R1) and 15 (R2), a current sense resistor 17 (R3), a voltage sense network 19 consisting of resistors 21 (R4) and 23 (R5), and a voltage comparator 14. The electrical component to be protected by power protection circuit 10 is component 16. Component 16 can, for example, be a pass element, such as a pass transistor which is controlling power to a load through output line 18. Power protection circuit 10 receives a threshold voltage, representing the power level to which protection of component 16 is desired, through threshold line 20.

In operation, power protection circuit 10 measures the current through component 16 as a voltage drop across resistor 17 (R3) and approximately measures the voltage across component 16 as the voltage drop across resistors 21 (R4) and 23 (R5). Circuit 10 also, through the proper choice of resistance values, produces a first voltage across resistor 15 (R2) that represents a normalized sum of the values of the current through resistor 17 (R3) and the voltage drop across resistors 21 (R4) and 23 (R5). The current and voltage are respectively normalized by the maximum current ($I_{max}$) and voltage ($V_{max}$) sustainable by component 16 under any circumstances. The voltage across resistor 15 (R2) is then compared to the threshold voltage by voltage comparator 14, which produces an overpower signal when the voltage across resistor 15 (R2) exceeds the threshold voltage on line 20. The overpower signal is then passed via output line 22 to shutdown circuitry 23 controlling component 16. The shutdown circuitry causes the current passing through component 16 to be interrupted. If component 16 is a pass transistor, for example, the pass transistor can be turned off in response to the signal on output line 22 by inhibiting the current to the base of the pass transistor. This current can be inhibited by removing the $V_{rail}$ voltage through the shutdown circuitry 23 such as a switch or by causing zero volts to appear across the load.

The approximate operation of power protection circuit 10 can be explained as follows: the comparison voltage ($V_2$) across resistor 15 is related to the voltage across resistor 13 ($V_1$) by the equation $V_2 = A \times V_1$, where A is the gain of the sense amplifier made from PNP transistor 12 and resistors 13 and 15. Voltage $V_1$ across resistor 13 (R1) is, excluding the small voltage between the emitter and collector of PNP transistor 24, the sum of the voltage drops across resistors 17 (R3) and 21 (R4). Therefore, $V_2 = A \times (V_3 + V_4)$. The voltage drop across resistor 17 (R3) senses the pass current $I_{pass}$ and the voltage $V_4$ across resistor 21 is approximately (again ignoring the small voltage drop across PNP transistor 24) given by the resistive voltage divider relationship established on the voltage drop across component 16 by resistors 21 (R4) and 23 (R5). Thus, $V_3 = I_{pass} \times R3$ and $V_4 = V_{pass} \times (R4/(R4+R5))$, where $R4/(R4+R5) = C$. Substituting these two relationships into the equation for $V_2$ gives $V_2 = A \times (-(I_{pass} \times R3) + (C \times V_{pass}))$.

Next, values of the resistors 13, 15, 17, 21, and 23 (R1–R5, respectively) are chosen so that the voltage across resistor 15 (R2) is proportional to the sum of the $I_{pass}$ current and the $V_{pass}$ voltage, which are normalized by $I_{max}$ and $V_{max}$, respectively. Designating these normalized variables by I and V, respectively, the value for resistor 17 (R3) is selected so that when V is negligibly small (=0), comparison voltage $V_2$ reaches a threshold voltage $V_{th}$ when I assumes its maximum value (=1). Thus, the relationship above becomes $V_{th} = A \times R3$.

Similarly, at the other extreme of operation of component 16 (i.e., when I=0 and V=1), the relationship above becomes $V_{th} = A \times (R4/(R4+R5))$.

Figure 2:
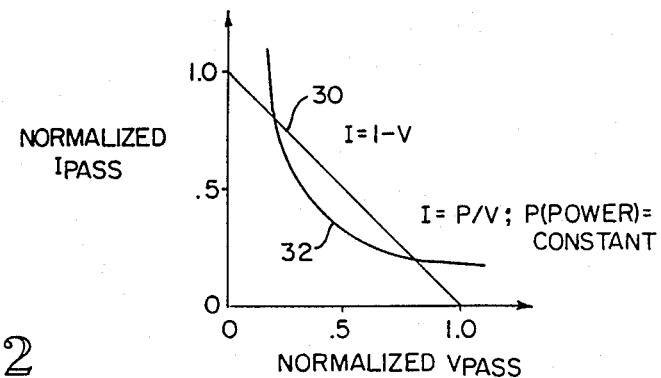
FIG. 2 is a graphical comparison of the power approximation of the present invention to the true power curve.

Choosing the resistors to obey the relationships above in effect causes the normalized current and voltage through and across components 16 to be related by the approximate formula $I + V = 1$. This relationship is shown by the straight line that is approximate power curve 30 in FIG. 2. Curve 30 can be compared to theoretical constant power curve 32 in FIG. 2. Since approximate power curve 30 represents the threshold, any time that the comparison voltage $V_2$ exceeds this threshold (i.e., lies to the right of curve 30), component 16 is said to be operating in an overpower region. When this happens, $V_2$ exceeds the voltage on threshold line 20 (in FIG. 1) and the signal on output line 22 goes high, constituting an overpower signal. The high signal on output line 22 is used to cause the current through component 16 to be interrupted.

Figure 3:
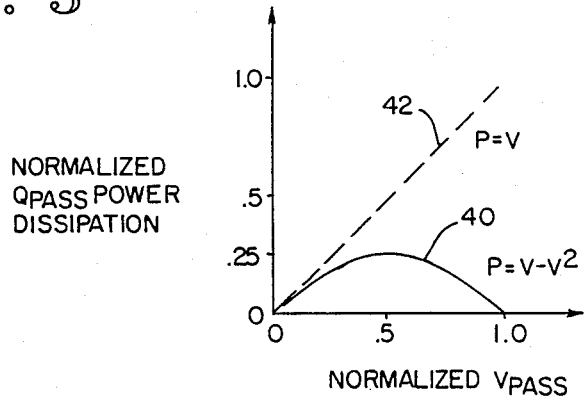
FIG. 3 is a graphical comparison of the maximum power dissipation of a conventional protection circuit and the normalized power dissipation as a function of normalized drop across the electrical component.

The operation of the present circuit can be compared to the power protection circuits known in the prior art by means of FIG. 3.

The relationship established between I and V by the circuitry of FIG. 1 causes the power dissipated by component 16, as a function of V, to be expressed as approximate power curve 40 in FIG. 3. Conventional power protection circuits, on the other hand, assume a constant current through the component to be protected, and, accordingly, the power dissipated is directly proportional to the voltage drop across the component. This relationship is expressed in conventional power curve 42 of FIG. 3. From a comparison of the two curves in FIG. 3, it is clear that the protection circuit of the present invention is conservative because the maximum power at which it will allow component 16 to operate is only one-fourth of the maximum power at which a conventional power protection circuit will operate.

The circuit in FIG. 1 has been chosen to provide perforance which is temperature-compensated. PNP transistors 12 and 24 should be chosen to be the same model transistor having, therefore, approximately the same base to emitter voltage drop. As this voltage drop varies as a function of temperature, PNP transistor 24 compensates for the temperature effects on transistor 12. The circuit of FIG. 1 has been chosen for its small number of required components. The conservative nature of this circuit enables the safe, reliable use of much smaller components 16 and heat sinks in power protection circuit 10, yielding both cost savings and performance increases.

While those skilled in the art will readily appreciate that many possible modifications can be made to the specific embodiment of the power protection circuit of the present invention, the spirit and scope of the present invention is to be limited only by the following claims.

I claim:

1. A signaling circuit adapted to be connected to an electrical component to signal when the electrical component is consuming excessive power, the maximum allowable current through and voltage across the component being $I_{max}$ and $V_{max}$, respectively, the signaling circuit comprising:
   means for measuring the current through the electrical component;
   means for measuring the voltage across the electrical component;
   means for producing a comparison voltage that represents the sum of the values of I and V, I and V respectively being the normalized current through and voltage across the electrical component, the normalization factors being $I_{max}$ and $V_{max}$, respectively, the comparison voltage being an approximation to the power consumed by the electrical component; and
   means for comparing the comparison voltage to a threshold voltage and producing an overpower signal when the comparison voltage exceeds the threshold voltage.

2. The circuit signaling of claim 1 wherein the means for measuring the voltage across the electrical component compensates for the temperature dependence of the means for producing the comparison voltage.

3. The circuit signaling of claim 1 wherein the means for measuring the current through the electrical component is a resistor of a predetermined resistance, the voltage across the resistor representing the current through the electrical component.

4. The circuit of claim 1 wherein the means for measuring the voltage across the electrical component is a resistive voltage divider.

5. The circuit signaling of claim 2 wherein the means for producing the comparison voltage is a sense amplifier comprising a transistor having resistors separately connected to its emitter and its collector.

6. The circuit signaling of claim 1 wherein the means for comparing the comparison voltage to the threshold voltage is a voltage comparator.

7. A power protection circuit adapted to be connected to an electrical component to protect the electrical component from excessive power by interrupting the current through the electrical component in response to an overpower signal, the maximum allowable current through and voltage across the component being $I_{max}$ and $V_{max}$, respectively, the power protection circuit comprising:
   means for measuring the current through the electrical component;
   means for measuring the voltage across the electrical component;
   means for producing a comparison voltage that represents the sum of the values of I and V, I and V respectively being the normalized current through and voltage across the electrical component, the normalization factors being $I_{max}$ and $V_{max}$, respectively, the comparison voltage being an approximation to the power consumed by the electrical component; and means for comparing the comparison voltage to a threshold voltage and producing the overpower signal when the comparison voltage exceeds the threshold voltage.

8. The circuit power protection of claim 7 wherein the means for measuring the voltage across the electrical component compensates for the temperature dependence of the means for producing the comparison voltage.

9. The circuit power protection of claim 7 wherein the means for measuring the current through the electrical component is a resistor of a predetermined resistance, the voltage across the resistor representing the current through the electrical component.

10. The circuit power protection of claim 7 wherein the means for measuring the voltage across the electrical component is a resistive voltage divider.

11. The circuit power protection of claim 8 wherein the means for producing the first voltage is a sense amplifier comprising a transistor having resistors separately connected to its emitter and its collector.

12. The circuit power protection of claim 7 wherein the means for comparing the first voltage to the threshold voltage is a voltage comparator.

13. A power protection circuit adapted to be connected to an electrical component to protect the electrical component from excessive power, the maximum allowable current through and voltage across the component being Imax and Vmax, respectively, the power protection circuit comprising:
   a first resistor connected in series with the electrical component, the first resistor having a predetermined resistance chosen so that a first voltage across the first resistor represents the normalized current through the electrical component, the normalizing factor being Imax;
   resistive voltage divider means for measuring the voltage across the electrical component, the values of the resistors in the resistive voltage divider means having predetermined resistances chosen so that a second voltage produced by the voltage divider means represents the normalized voltage across the electrical component, the normalizing factor being Vmax;
   means for producing a voltage that represents the sum of the first and second voltages;
   a sense amplifier for producing a comparison voltage that represents the sum of the first and second voltages; and
   a voltage comparator for comparing the comparison voltage to a threshold voltage representing a predetermined power level and producing the overpower signal when the comparison voltage exceeds the threshold voltage.

14. The circuit power protection of claim 13 wherein the voltage divider means compensates for the temperature dependence of the sense amplifier.

15. A signaling circuit adapted to be connected to an electrical component to protect the electrical component from excessive power by interrupting the current through the electrical component in response to an overpower signal, the maximum allowable current through and voltage across the component being Imax and Vmax, respectively, the power protection circuit comprising:
   means for measuring the current through the electrical component;
   means for measuring the voltage across the electrical component;
   means for producing a comparison voltage that represents the sum of the values of I and V, I and V respectively being the normalized current through and voltage across the electrical component, the normalization factors being Imax and Vmax, respectively, the comparison voltage being an approximation to the power consumed by the electrical component;
   means for comparing the comparison voltage to a threshold voltage and producing the overpower signal when the comparison voltage exceeds the threshold voltage; and
   means for protecting the electrical component by interrupting the current through the electrical component in response to the overpower signal.

16. The signaling circuit of claim 15 wherein the means for measuring the voltage across the electrical component compensates for the temperature dependence of the means for producing the comparison voltage.

17. The signaling circuit of claim 16 wherein the means for producing the comparison voltage is a sense amplifier comprising a transistor having resistors separately connected to its emitter and its collector.

18. A power protection circuit adapted to be connected to an electrical component to protect the electrical component from excessive power, the maximum allowable current through and voltage across the component being Imax and Vmax, respectively, the power protection circuit comprising:
   a first resistor connected in series with the electrical component, he first resistor having a predetermined resistance chosen so that a first voltage across the first resistor represevts the normalized current through the electrical component, the normalizing factor being Imax;
   resistive voltage divider menans for measuring the voltage across the electrical component, the values of the resistors in the resistive voltage divider means having predetermined resistances chosen so that a second voltage produced by the voltage divider means represents the normalized voltage across the electrical component, the normalizing factor being Vmax;
   means for producing a voltage that represents the sum of the first and second voltages;
   a sense amplifier for producing a comparison voltage that represents the sum of the first and second voltages; and
   a voltage comparator for comparing the comparison voltage to a threshold voltage representing a predetermined power level and producing the overpower signal when the comparison voltage exceeds the threshold voltage; and
   means for protecting the electrical component by interrupting the current through the electrical component in response to the overpower signal.

19. The circuit of claim 18 wherein the means for measuring the voltage across the electrical component compensates for the temperature dependance of the means for producing the comparison voltage.

20. The circuit of claim 19 wherein the means for producing the first voltage is a sense amplifier comprising a transistor having resistors separately connected to its emitter and its collector.

* * * * *

UNITED STATES PATENT AND TRADEMARK OFFICE
CERTIFICATE OF CORRECTION

PATENT NO. : 4,837,653

DATED : June 6, 1989

INVENTOR(S) : Douglas Yip

It is certified that error appears in the above-identified patent and that said Letters Patent is hereby corrected as shown below:

In claims 2, 3, 5 and 6, delete "circuit signaling" and substitute therefor --signaling circuit--.

In claim 4, line 38, before "circuit" insert --signaling--.

In claims 8, 9, 10, 11, 12, and 14, delete "circuit power protection" and substitute therefor --power protection circuit--.

In claim 18, line 34, delete "he" and substitute therefor --the--, line 36, delete "represevts" and substitute therefor --represents--, and line 39, delete "menans" and substitute therefor --means--.

Signed and Sealed this

Seventeenth Day of April, 1990

*Attest:*

HARRY F. MANBECK, JR.

*Attesting Officer*   *Commissioner of Patents and Trademarks*